United States Patent
Tamasi et al.

(10) Patent No.: US 11,012,338 B2
(45) Date of Patent: *May 18, 2021

(54) NETWORK ADAPTIVE LATENCY REDUCTION THROUGH FRAME RATE CONTROL

(71) Applicant: NVIDIA Corporation, Santa Clara, CA (US)

(72) Inventors: Tony Tamasi, Los Gatos, CA (US); Xun Wang, San Jose, CA (US); Franck Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,942

(22) Filed: Feb. 21, 2020

(65) Prior Publication Data

US 2020/0244559 A1 Jul. 30, 2020

Related U.S. Application Data

(63) Continuation of application No. 13/728,927, filed on Dec. 27, 2012, now Pat. No. 10,616,086.

(51) Int. Cl.
  *H04L 12/26* (2006.01)
  *H04L 29/06* (2006.01)

(52) U.S. Cl.
  CPC ...... *H04L 43/0876* (2013.01); *H04L 43/0858* (2013.01); *H04L 65/602* (2013.01); *H04L 65/80* (2013.01)

(58) Field of Classification Search
  CPC ... H04L 65/80; H04L 65/602; H04L 43/0858; H04L 43/0876
  See application file for complete search history.

(56) References Cited

U.S. PATENT DOCUMENTS 5,995,518 A  11/1999  Burns
6,182,125 B1  1/2001  Borella
(Continued)

FOREIGN PATENT DOCUMENTS

EP  2073552  6/2009
TW  201041401  11/2010
(Continued)

OTHER PUBLICATIONS

Sudhakaran, Sareesh. The Difference Between encoding, Transcoding and Rendering [online]. Wolfcrow, Jan. 29, 2013 [retrieved on Sep. 30, 2006]. Retrieved from the internet: ,URL: http://web.archive.org/web/20130511025703/http://wolfcrow.com/blog/the-difference-between-encoding-transcoding-and-rendering/.

(Continued)

*Primary Examiner* — Abdullahi E Salad
(74) *Attorney, Agent, or Firm* — Shook, Hardy & Bacon, L.L.P.

(57) ABSTRACT

Novel solutions are provided for consistent Quality of Service in cloud gaming system that adaptively and dynamically compensate for poor network conditions by moderating rendered frame rates using frame rate capping to optimize for network latency savings (or surplus). In further embodiments, the encoding/sent frame rate to the client can also be managed in addition, or as an alternative to capping the rendered frame rates. The claimed embodiments not only maintain a constant Quality of Service (QoS) for the user, but may also be employed to leverage higher-performing networks to reduce operational costs.

20 Claims, 5 Drawing Sheets

(56) References Cited

U.S. PATENT DOCUMENTS

| | | |
|---|---|---|
| 6,665,751 B1 | 12/2003 | Chen |
| 7,016,407 B2 | 3/2006 | Kaye |
| 7,516,255 B1 | 4/2009 | Hobbs |
| 8,446,452 B2 | 5/2013 | Hosseini et al. |
| 9,619,916 B2 | 4/2017 | Steinke |
| 10,320,951 B2* | 6/2019 | Leber .................. H04W 4/50 |
| 2002/0172153 A1 | 11/2002 | Vernon |
| 2003/0223497 A1 | 12/2003 | Suzuki |
| 2004/0057381 A1 | 3/2004 | Tseng |
| 2004/0131067 A1 | 7/2004 | Cheng |
| 2004/0148423 A1 | 7/2004 | Key |
| 2005/0033856 A1 | 2/2005 | Li |
| 2005/0036546 A1 | 2/2005 | Rey et al. |
| 2005/0084232 A1 | 4/2005 | Herberger |
| 2005/0132264 A1 | 6/2005 | Joshi |
| 2005/0232151 A1 | 10/2005 | Chapweske |
| 2006/0077902 A1 | 4/2006 | Kannan |
| 2006/0165166 A1 | 7/2006 | Chou |
| 2006/0184697 A1 | 8/2006 | Virdi et al. |
| 2006/0230171 A1 | 10/2006 | Dacosta |
| 2007/0024705 A1 | 2/2007 | Richter |
| 2007/0067480 A1 | 3/2007 | Beek et al. |
| 2007/0180106 A1 | 8/2007 | Pirzada et al. |
| 2007/0183493 A1 | 8/2007 | Kimpe |
| 2007/0201388 A1 | 8/2007 | Shah |
| 2007/0294173 A1 | 12/2007 | Levy |
| 2008/0043643 A1 | 2/2008 | Thielman |
| 2008/0052414 A1 | 2/2008 | Panigrahi |
| 2008/0055311 A1 | 3/2008 | Aleksic |
| 2008/0084900 A1 | 4/2008 | Dunn |
| 2008/0101466 A1 | 5/2008 | Swenson et al. |
| 2008/0165280 A1 | 7/2008 | Deever |
| 2008/0267069 A1 | 10/2008 | Thielman et al. |
| 2009/0207172 A1 | 8/2009 | Inoue |
| 2009/0222873 A1 | 9/2009 | Einarsson |
| 2009/0252227 A1* | 10/2009 | NepomucenoLeung .................... H04N 19/107 375/240.13 |
| 2010/0036963 A1 | 2/2010 | Gahm |
| 2010/0063992 A1 | 3/2010 | Ma et al. |
| 2010/0201878 A1* | 8/2010 | Barenbrug ......... H04N 21/4318 348/563 |
| 2011/0058554 A1 | 3/2011 | Jain et al. |
| 2011/0255841 A1 | 10/2011 | Remennik |
| 2011/0263332 A1* | 10/2011 | Mizrachi ............... A63F 13/358 463/42 |
| 2011/0276710 A1* | 11/2011 | Mighani ............... H04L 65/605 709/231 |
| 2012/0004040 A1 | 1/2012 | Pereira et al. |
| 2012/0005365 A1* | 1/2012 | Ma ....................... H04L 65/607 709/231 |
| 2012/0250762 A1 | 10/2012 | Kaye et al. |
| 2012/0254456 A1 | 10/2012 | Visharam et al. |
| 2012/0265892 A1* | 10/2012 | Ma ..................... H04N 21/6125 709/231 |
| 2012/0281552 A1* | 11/2012 | Niu ..................... H04B 7/0632 370/252 |
| 2012/0281562 A1* | 11/2012 | Holmer ............ H04N 21/44004 370/252 |
| 2012/0311043 A1 | 12/2012 | Chen |
| 2013/0097309 A1* | 4/2013 | Ma ..................... H04L 67/2847 709/224 |
| 2013/0107930 A1 | 5/2013 | Le Faucheur et al. |
| 2013/0120651 A1 | 5/2013 | Perry |
| 2013/0159393 A1 | 6/2013 | Imai |
| 2013/0254330 A1 | 9/2013 | Maylander et al. |
| 2013/0300633 A1 | 11/2013 | Horio |
| 2013/0307847 A1* | 11/2013 | Dey .......................... G06T 1/00 345/419 |
| 2014/0085314 A1 | 3/2014 | Steinke |
| 2014/0122562 A1 | 5/2014 | Turner |
| 2015/0019670 A1 | 1/2015 | Redmann |
| 2015/0026309 A1* | 1/2015 | Radcliffe ................ H04L 69/14 709/219 |
| 2015/0207837 A1 | 7/2015 | Guerrera |
| 2015/0207873 A1* | 7/2015 | Chang ................ H04L 67/1048 709/205 |
| 2015/0215359 A1 | 7/2015 | Bao |
| 2015/0340009 A1 | 11/2015 | Loeffler |
| 2018/0270284 A1* | 9/2018 | Lee ..................... H04L 65/601 |
| 2019/0308099 A1* | 10/2019 | Lalonde .................. G06T 1/20 |
| 2019/0321725 A1* | 10/2019 | Zimring ............... A63F 13/355 |

FOREIGN PATENT DOCUMENTS

| | | |
|---|---|---|
| TW | 201202975 | 1/2012 |
| TW | 201223256 | 6/2012 |
| TW | 201230850 | 7/2012 |
| WO | 2012078640 A2 | 6/2012 |

OTHER PUBLICATIONS

Preinterview First Office Action dated Sep. 18, 2020, in U.S. Appl. No. 16/797,948, 4 pages.

Notice of Allowance dated Jan. 8, 2021 in U.S. Appl. No. 16/797,948, 8 pages.

* cited by examiner

Exemplary Computer System 500

NETWORK ADAPTIVE LATENCY REDUCTION THROUGH FRAME RATE CONTROL

CROSS REFERENCE TO RELATED APPLICATIONS

This application is a continuation of U.S. Non-Provisional application Ser. No. 13/728,927, filed Dec. 27, 2012, which is hereby incorporated by reference in its entirety.

BACKGROUND

Cloud computing provides processing, capacity, and storage on demand. Typical cloud computing service allow a user to access and requisition a virtually unlimited amount of computing resources on demand from a pool of shared computing resources. Often, these resources may consist of virtualized instances of actual computer hardware systems (e.g., servers).

[SIC] Cloud computing providers may include many different types of cloud services. An area of increasing popularity in cloud computing is cloud gaming. Cloud gaming, also called gaming on-demand, is a type of online gaming that allows direct and on-demand streaming of games onto a computer or other electronic device, typically through a network, such as the Internet. Conventionally, a video game provided by a cloud gaming operator stores the software of the video game on one or more servers. When a user accesses the servers—typically through a network connection—the software is executed and the resultant graphical output is streamed to the user's computer or display device.

Generally, the actual rendering and processing of the images constituting the graphical content displayed to the user is also performed in the servers, before being encoded (compressed) and then transmitted (streamed) to the user's device, where the encoded video stream is subsequently decoded and displayed. User control input—typically responsive to the progression of images displayed—may be received from the user and directly transmitted back to the server, whereupon the input is recorded, and a new set of images may be processed, rendered, encoded, and then streamed back to the user or "client" device. This process may be performed continuously for each user, and often for substantially the entirety of the time the video game is being played by the user.

Cloud gaming allows users to access games without the need for a dedicated gaming console or gaming system, and largely eliminates higher hardware requirements for the computer systems of users, by abstracting the majority of the memory and processing needs from the user's device and on to the server. Moreover, the time required to download and install the video game on the user's local device is eliminated, since the software is already pre-loaded on the servers of the game's operator.

Unfortunately, a new host of challenges are also introduced by cloud gaming over traditional, localized gaming solutions. For example, additional steps are required to prepare the graphical output for display, such as compressing the video continuously in real time, decompressing the video at the user's client device, and continuously streaming data through a network connection. The challenge to perform these steps quickly and efficiently enough to not noticeably impact the user's experience while accommodating limitations due to the network infrastructure is considerable.

One quantifiable measure of this efficiency is the latency experienced by the user. Latency is a measure of the responsiveness of the user's input to the server and back, and can be influenced by a host of variables, including how fast the server is running, the efficiency of the software and hardware running on the server, the network infrastructure, and the distance that the network has to travel to the user's device on the client side. The further that the user's device is from the server for example, either in distance or network hops or network quality, the more latency that could be introduced due to lengthier transmission or routing times. Long latencies, often referred to as "lag" by video game players, are undesirable, particularly during competitive games and/or time-sensitive interactions in games, and can have a significant negative effect on user experience.

Unfortunately, many traditional cloud gaming systems do not account for network attributed latency at all, considering them to be unavoidable or inevitable. At best, cloud gaming operators may attempt to manage latencies by provisioning additional resources at the server side to expedite processing. However, this can increase capital expenditure costs for the game's operators, potentially prohibitively, and is neither an efficient nor effective solution. Still other cloud gaming operators may attempt to avoid latencies altogether by limiting the applications offered, either by limiting the complexity of the images being rendered and the size and/or frequency of the data transmissions or providing only games with asynchronous and/or mechanisms unrelated to timing. Unfortunately, this also restricts user choice to those video games, and may prevent users from accessing a fuller library of software entertainment.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments of the claimed subject matter are directed to methods and systems that allow the delivery of a more consistent quality of service, latency-wise, for cloud rendering by moderating rendered frame rates using frame rate capping to optimize for network latency savings (or surplus). In further embodiments, the encoding/sent frame rate to the client can also be managed in addition, or as an alternative to capping the rendered frame rates. The claimed embodiments not only maintain a constant Quality of Service (QoS) for the user, but may also be employed to leverage well-performing networks to reduce operational costs.

According to an aspect of the invention, a cloud gaming system is provided that implements a method for moderating rendered frame rates to optimize for network latency. In an embodiment, the latency of a network is monitored, and based on the monitored latency, the frame rate of the image renderer is either increased to compensate for relatively poor network latency, or decreased to leverage a high performing network and to reduce the level of power consumption while maintaining a constant latency experience for the user. Monitoring of the network latency can be performed in real time, and the modifications to the rendering frame rate may be performed dynamically as network and/or game conditions change.

Since a substantial portion of latency for cloud rendering can be attributable to the network infrastructure between a user and the cloud gaming datacenter (which has a potentially high degree of variability due to distance from the cloud data center), increasing rendered frame rates to compensate for poor network conditions can be utilized to deliver a more consistent quality of service. Likewise, for users with higher performing network connections, the rendering frame rate can be relaxed (decreased) to the minimum or near minimum frame rate that still ensures a constant displayed frame rate.

Typically, video games are displayed at a constant and pre-determined frame rate. Traditionally, this rate corresponds to the number of displayed frames-per-second (often abbreviated as "fps") on the user's client device, and is commonly set to 30, 60, or 75 frames per second, though frame rates at 100 to 200 fps or higher are not unknown. When network conditions are favorable—that is, when latency attributable to the network is relatively low—the images may be processed and rendered at the server at a rate below the server's capability, or even the default rendering rate, so long as the images, after encoding and streaming through the network, may be displayed continuously at the pre-determined frame rate. When rendering at a lower frame rate, the server requires less power to operate, and therefore, over time, can experience significant savings to operational costs.

BRIEF DESCRIPTION OF THE DRAWINGS

The accompanying drawings, which are incorporated in and form a part of this specification, illustrate embodiments of the invention and, together with the description, serve to explain features of the disclosure.

[SIC]

DETAILED DESCRIPTION

Figure 1:
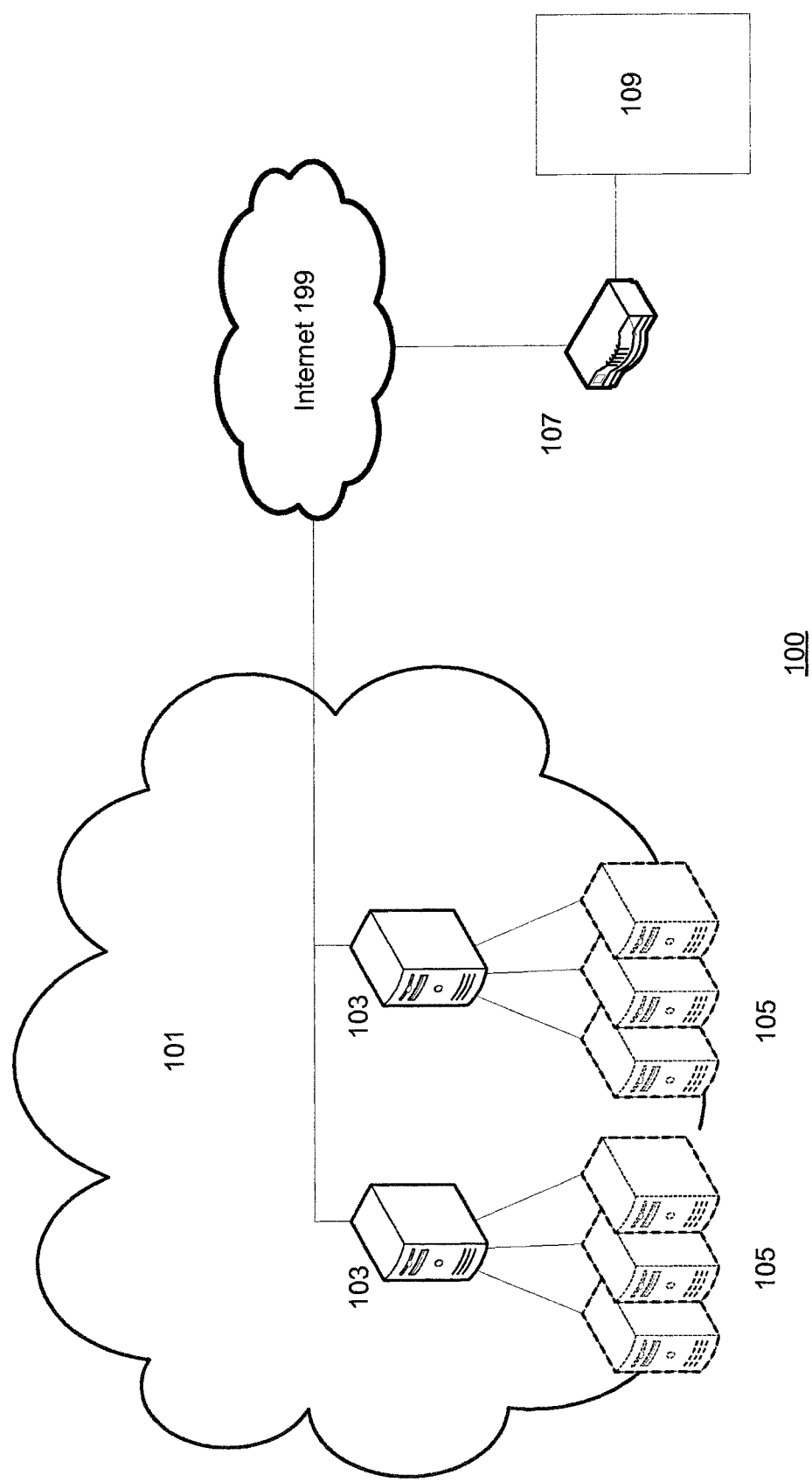
FIG. 1 is a block diagram of a cloud gaming access model, in accordance with various embodiments of the claimed subject matter.

Reference will now be made in detail to embodiments of the claimed subject matter for managing applications to avoid low and/or compromised bandwidth in a cloud data center, examples of which are illustrated in the accompanying drawings. While the claimed subject matter will be described in conjunction with the disclosed embodiments, it will be understood that they are not intended to be limit to these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Cloud Access Model

FIG. 1 is an illustration of an exemplary cloud access model 100, in accordance with various embodiments of the present invention. As presented in FIG. 1, cloud access model 100 may include a cloud data center 101 with a plurality of servers 103, and communicatively coupled to a client device 109 via the Internet 199. According to various embodiments, one or more servers 103 may comprise a plurality of instantiated virtual servers 105. The servers 103 may be configured to comprise multiple logical partitions corresponding to the virtual servers, and which one or more software applications (e.g., games) may be hosted on and executed from. Users may access the games by connecting to the virtual servers (e.g., through the Internet 199), even though the actual processing and rendering of the graphical output may be performed on the physical server itself.

The client device 109 may comprise a variety of consumer and personal electronic devices. Examples of the client device 109 include, but are not limited to: personal desktop or laptop computers, mobile cellular handsets (e.g., smartphones), tablet computer devices, set top boxes, (portable) video game console devices, or any other device capable of displaying pre-rendered graphical content and receiving user input. The client device 109 may belong to a local area network (LAN), and connected to one or more gateways of the Internet 199 through a router and/or modem 107. According to some embodiments, the client device 109 may include, and/or be communicatively coupled with a display device, such as a screen or communicatively coupled monitor.

In an embodiment, a user of the client device 109 may access a cloud gaming software application by executing a portion of software on the client device 109 that creates a network connection with a corresponding server 103 in the cloud data center 101. In some instances, a graphical user interface may be generated and displayed, which prompts the user to log in to the game operator's servers (e.g., through an authentication process). Once authenticated, a play session may be initiated, and graphical content may be continuously transmitted during the play session through the network connection between the client device 109 and a server 103 in the cloud date center 101. The graphical content may comprise one or more series of images that are processed and rendered in one or more graphics processing units (GPUs) comprised in the server 103 at one or more variable rendering frame rates. Once rendered, the images may be compressed into an encoded video, buffered, and then streamed as a plurality of data packets. According to further embodiments, the rate at which the data packets are streamed (i.e., the streaming frame rate) from the buffer may also be monitored and variably managed.

Once the encoded data is received in the client device 109, the data is decoded (decompressed) and displayed to the user (e.g., in the display device) at a displayed frame rate. The displayed frame rate may be expressed as a measure of the frames per second ("fps") displayed (e.g., 30, 60, 90). User input received in the client device 109—through a graphical user interface, or other hardware input devices such as a mouse, keyboard, or controller—is transmitted directly to the server 103, and the next series of images in a sequence or a new series of images responsive to user input may be processed, rendered, encoded, and streamed back to the client device 109.

According to an aspect of the present invention, the latency experienced by the user, that is, the length of time between which the user input is received in the client device 109 and the display of the next series of images in the display device is constantly monitored. Latency may be influenced by a variety of factors including the rendering frame rate and/or the streaming frame rate at the server, the efficiency of the network infrastructure between the cloud data center 101 and the client device 109, and the distance in the network (either the physical distance, or the "logical" distance) between the cloud data center 101 and the client device 109. Higher latencies may manifest as a delay (e.g., "lag") between user action and graphical response, and is generally undesirable. According to various embodiments, one or both of the rendering frame rate and the streaming frame rate may be dynamically increased when latency is detected above a certain threshold.

By increasing the rendering and/or streaming frame rate(s), the length of time to produce and render each frame within the server decreases, lowering the contribution by the server to the overall latency. A reduction of a few milliseconds per frame rendered compensates for an equivalent length of time elsewhere in the transmission loop. For example, rendering at 30 fps (corresponding to the display frame rate at the client device 109, for example) produces a frame roughly once every 33 milliseconds. Increasing the rendering rate to 60 fps while maintaining the same display frame rate reduces the production time of a frame to roughly once every 16 milliseconds. The "extra" 16 to 17 milliseconds per frame can be used to compensate for delays in the network infrastructure, network distance, or decoding at the client device 109.

Likewise, when network attributed latency is not an issue, due to proximity to the data center and/or high performing infrastructures, encoded video data that is received and decoded at a rate higher than the display rate may be buffered at the client device. To avoid allowing the buffer to become excessively full, the rendering frame rate may be throttled, that is, decreased, as the extra production is no longer necessary to compensate for network latency. By decreasing the rendering frame rate, the components responsible for processing and rendering the frames (e.g., the graphics processing units) may be placed in a lower power state, and thereby consume power at a lower rate. Typically, a large portion of the cost for a cloud gaming operator is the cost of operating the data center, and the largest single factor incurred by operating a data center is the required power usage. Thus, leveraging high-performing network connections to increase the efficiency of the consumption of power can result in substantial savings to cloud gaming operators.

Cloud Access Model

Figure 2:
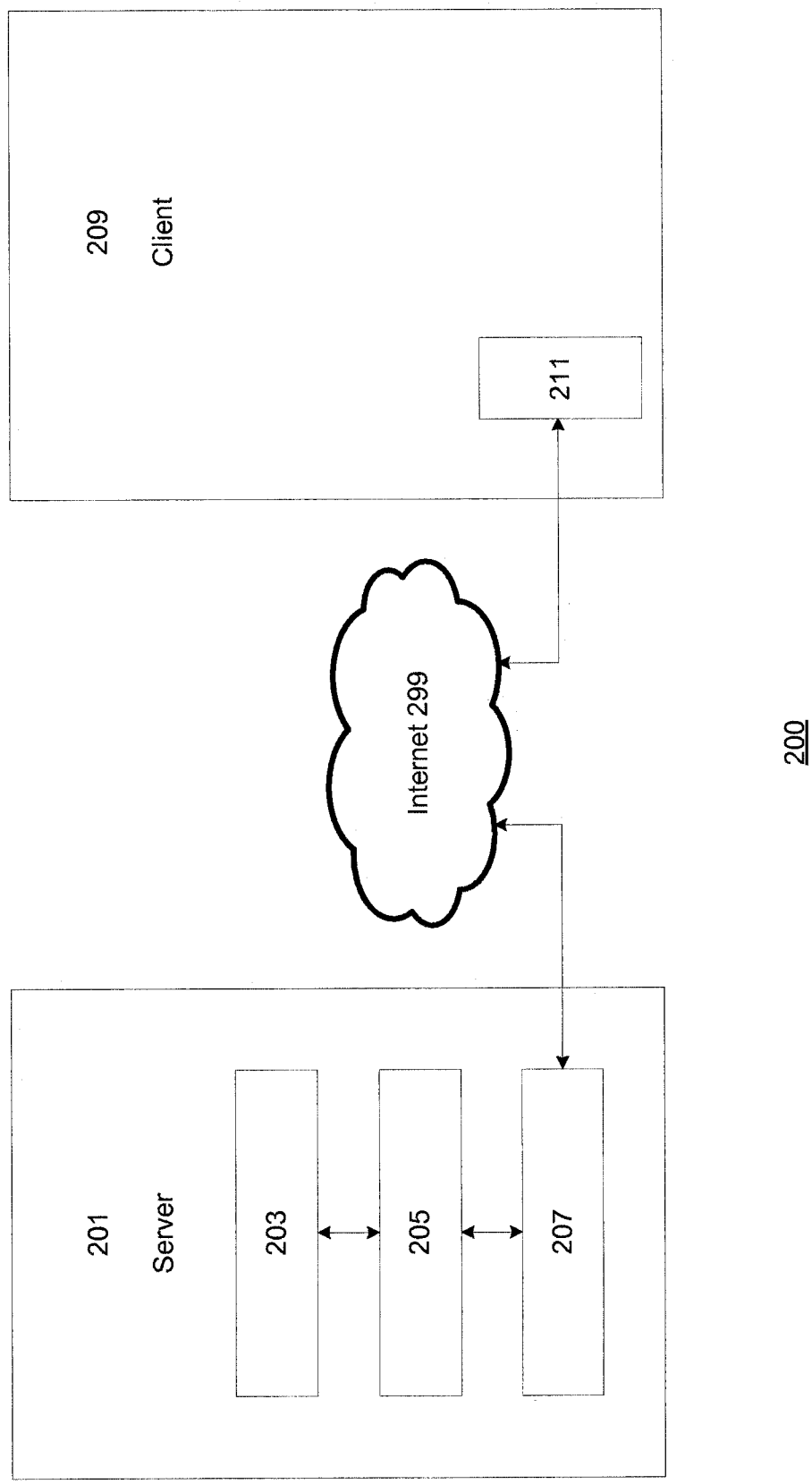
FIG. 2 is a block diagram of a cloud gaming server architecture, in accordance with conventional practice.

FIG. 2 is an illustration of an exemplary cloud gaming server architecture 200, in accordance with various embodiments of the present invention. As presented in FIG. 2, cloud gaming server architecture 200 may include a cloud gaming server 201 communicatively coupled to a client device 209 via the Internet 299. As depicted in FIG. 2, the cloud gaming server 201 includes an image rendering component 203 (e.g., one or more graphics processing unit(s)), operable to receive and process programmed instructions from a memory (not shown) and to render graphical images according to the instructions. Cloud gaming server 201 is also depicted to include a server control module 205, coupled to rendering component 203, and configured to monitor the latency of data streamed over network connections with client devices 209 and to dynamically adjust the rate at which images are rendered by the rendering component 203 based on the monitored latency.

In an embodiment, during a gaming session, a network connection is established through the Internet 299 between a client control module 211 in the client device 209 and a stream component 207 in the server 201. Frames which are rendered in rendering component 203 may be received in server control module 205 and passed to stream component 207. The stream component 207 can encode and compress the received image data into encoded video, which the stream component 207 then transmits as a plurality of packets over time to the client control module 211 in the client device 209. User input (e.g., controller input) received in the client device 209 is then forwarded back to the server 201 and recorded, before programmed instructions corresponding to the user input are referenced and a new or next sequence of images are processed and rendered. The latency of the gaming session (including the latency attributable to the network and the latency attributable to producing the encoded video streams) corresponds to the length of time between the reception of user input in the client device 209 and the display of the new or next sequence of images in the client device 209 responsive to the user input. According to various embodiments, the latency may be monitored by the server control module 205, or the client control module 211, which then notifies the server control module 205 of the detected latency.

When latency is high—such as above a pre-determined threshold—the server control module 205 can dynamically adjust the power state of the rendering component 203 up, and increase the rendering frame rate of the rendering component 203 to reduce the latency contribution of the game server. Likewise, the stream component 205 can also increase the stream rate separately, or in addition to increasing the rendering frame rate of the rendering component 203. When latency is low—below a second pre-determined threshold for example—the server control module 205 can adjust the power state of the rendering component 203 down, effectively capping the rendering frame rate of the rendering component 203 to increase the latency contribution of the game server but reduce the rate power is consumed by the rendering component 203. Based on bandwidth and latency between the client and server, the game's images may be rendered at a rate N fps in the rendering component 203, and streamed at rate X from the stream component 207. According to some embodiments, monitoring of the latency may be performed in real time and one or both of the frame rate and encoding/decode rate may be adjusted dynamically. According to still further embodiments, data transmissions between the server 201 and the client device 209 performed during an active game session may be performed according to the Real-time Transport Protocol (RTP). Under RTP, latency and packet loss (due to a drop in bandwidth) are constantly measured. This data is communicated to the stream component 207, and relayed to the server control module 205, which will then modify the rendering frame rate of the game accordingly. In still further embodiments, a default profile/heuristic that includes values for the render, stream, and/or display frame rates may be created and stored per game.

Dynamically Adjusting Rendering Frame Rates in Cloud Gaming Server

Figure 3:
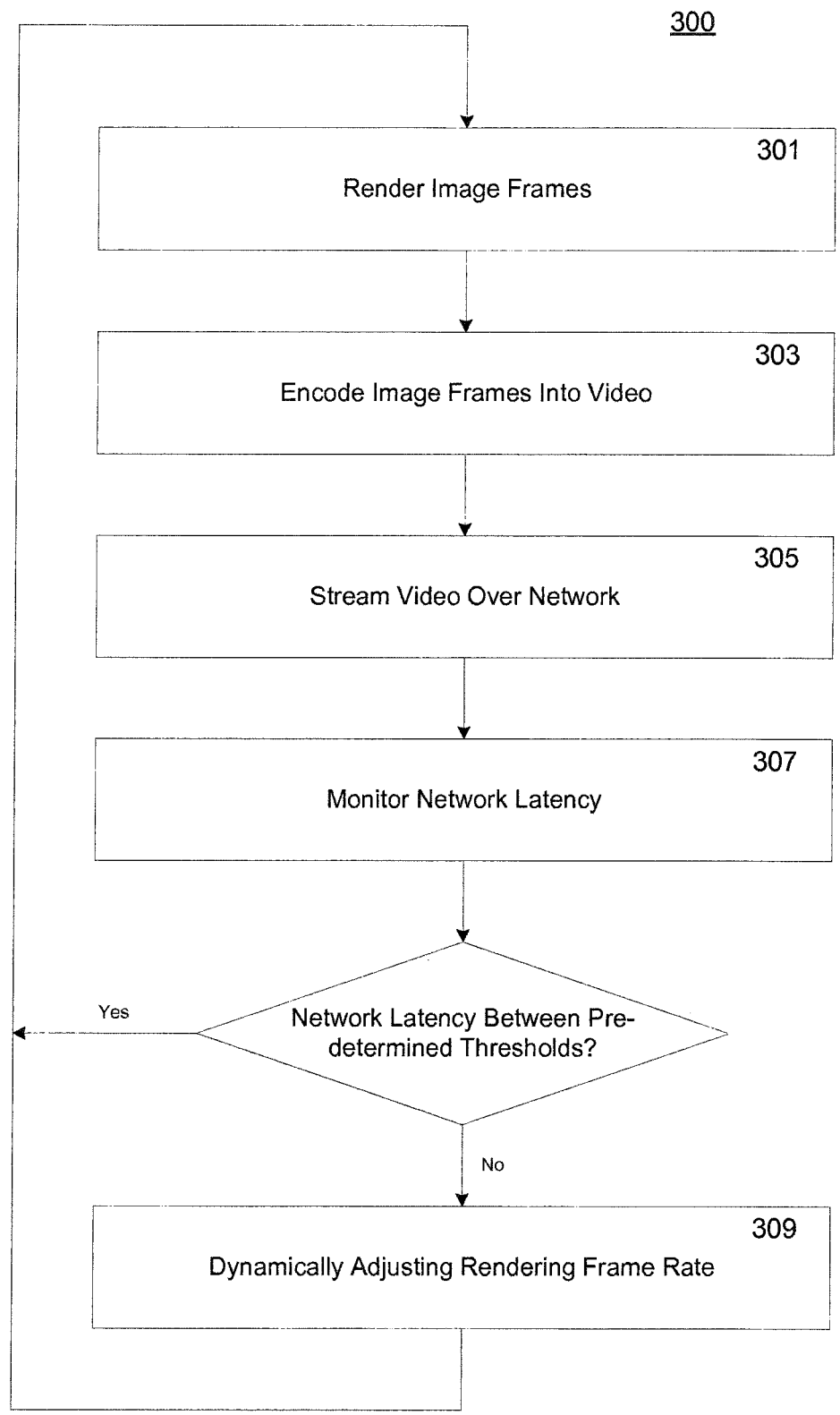
FIG. 3 is an illustration of a flowchart for dynamically adjusting rendering frame rates in a cloud gaming server, in accordance with various embodiments of the claimed subject matter.

FIG. 3 is an illustration of a flowchart 300 for dynamically adjusting rendering frame rates in a cloud gaming server, in accordance with an embodiment. Specifically, the method describes the steps performed to dynamically adjust the production rate of graphical images in response to detected latency conditions. Steps 301-309 describe the steps comprising the process depicted in the flowchart 300 of FIG. 3. In one embodiment, the flowchart 300 is performed by a server in a cloud data center.

At step 301, a sequence of graphical images are processed and rendered as frames. The graphical images may be rendered by a dedicated graphics processor, such as a graphics processing unit, in a server of a cloud data center, for example. In an embodiment, the graphical images may be rendered at a pre-determined rendering frame rate, and according to programmed instructions in a local memory. In still further embodiments, the graphical images may be rendered at the highest rendering frame rate possible for the graphics processor, and/or correspond to the current power state of the graphics processor. Once rendered, the sequence of frames is encoded into a video of a compressed format at step 303, and streamed as video over a network connection. In an embodiment, the video is streamed at 305 at a second pre-determined frame rate, e.g., the streaming frame rate, and may be streamed over a variety of Internet protocols corresponding to various embodiments. These protocols may include, for example, Real-time Protocol (RTP), Real-time Streaming Protocol (RTSP), session initiation protocol (SIP), Hyper-Text Transport Protocol (HTTP), among others. Streaming may be performed during a gaming session initiated with one or more of these protocols, and received in a client device communicatively coupled to the server through a network, such as the Internet.

At step 307, the latency of data transmissions during the gaming session is continuously monitored. Monitoring may be performed continuously at periodic intervals, to accompany events (e.g., successful or unsuccessful transmissions), and/or responsive to frequent trigger events. When the monitored latency is determined to be within normal boundaries, that is, not exceeding one or more pre-determined thresholds, steps 301-307 are repeated for the duration of the gaming session. When the monitored latency is determined to exceed a predetermined threshold, that is, if the latency is above a first threshold that represents the upper bound of an acceptable amount of latency, the pre-determined rendering frame rate is dynamically adjusted, such that the next sequence of images is rendered at a higher frame rate. As discussed above, increasing the rendering and/or streaming frame rate(s) reduces the length of time required to produce and render each frame in server, thereby lowering the server's contribution to the overall latency. On the other hand, if the latency is below another threshold that indicates the presence of a surplus in processing speed, the rendering frame rate can be dynamically adjusted for the next sequence of images, such that the frames are produced at a slower rate, and increasing the server's contribution to the overall latency. Under such conditions, the rendering frame rate may be prevented from dropping below a minimum frame rate required to maintain a constant Quality of Service to the user (e.g., a minimum 30 fps displayed). In further embodiments, the rendering frame rate may be decreased to the lowest frame rate that still provides a consistent QoS. In further embodiments, the power state of the graphics processor performing the rendering and/or the server itself, may be adjusted (decreased) to correspond to the adjusted rendering frame rate.

Once adjusted (either increased or decreased), the next sequence of frames are rendered with the adjusted frame rate, and steps 301 through 307 are repeated. In further embodiments, the display of the rendered frames may be accompanied by user input corresponding to user control. According to such embodiments, the next sequence of frames may be rendered responsive to the user input and at the adjusted rendering frame rate. In still further embodiments, the rate of streaming of the encoded video performed in step 305 may also be adjusted at step 309 for the same purposes as adjusting the rendering frame rate.

Displaying Graphical Output with Dynamically Adjusted Rendering Frame Rates

Figure 4:
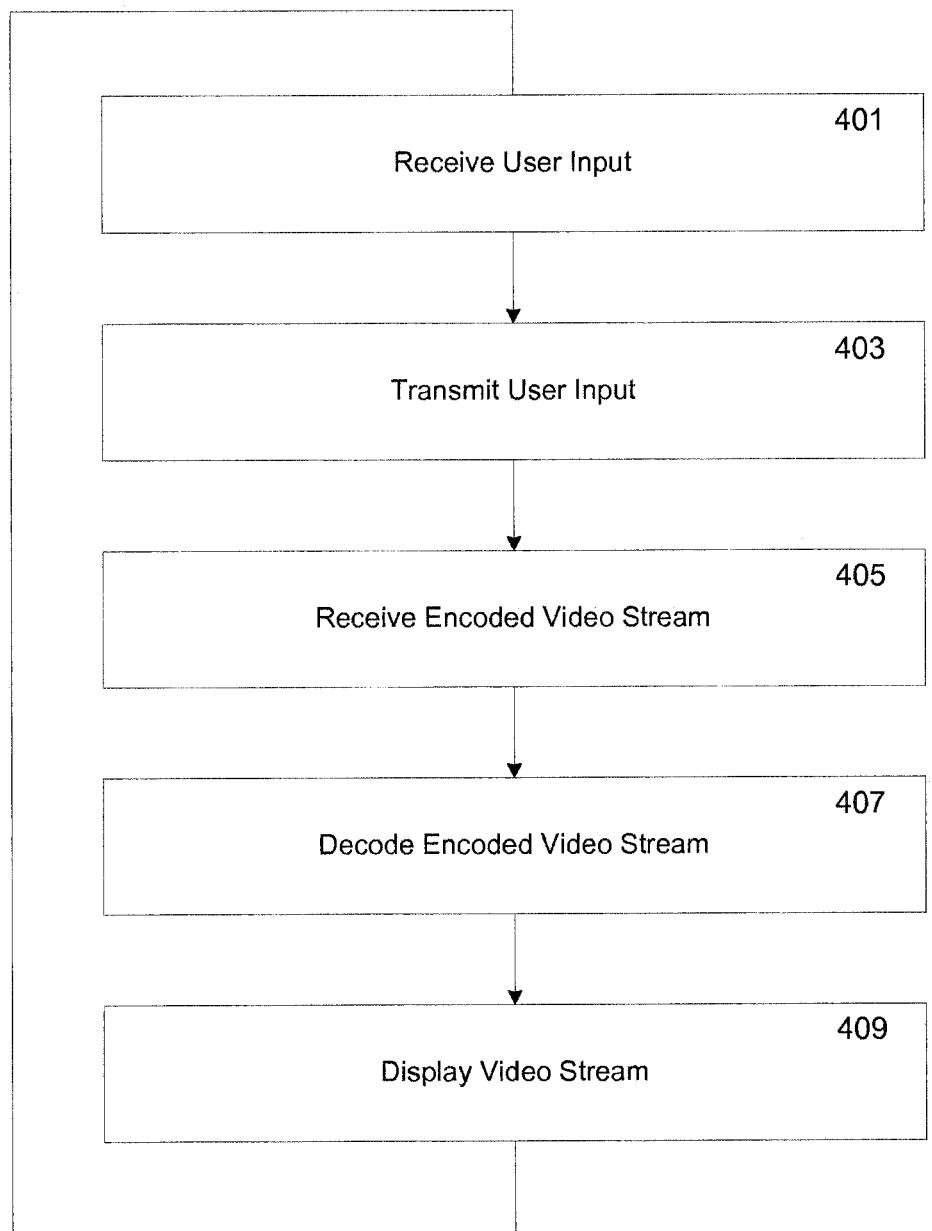
FIG. 4 is an illustration of a flowchart for displaying graphical output with dynamically adjusted rendering frame rates, in accordance with various embodiments of the claimed subject matter.

FIG. 4 is an illustration of a flowchart 400 for displaying graphical output with dynamically adjusted rendering frame rates, in accordance with an embodiment. Specifically, the method describes the steps performed in a client device to display images rendered with dynamically adjusted rendering frame rates. Steps 401-409 describe the steps comprising the process depicted in the flowchart 400 of FIG. 4. In one embodiment, the flowchart 400 is performed in a client device with physically incorporated display screens and (wireless) networking capability, which may include (but are not limited to): mobile smartphones, laptop or tablet computers, personal digital assistants, handheld video game consoles. In still further embodiments, the flowchart 400 is performed in a client device with a communicatively coupled display device. Under these embodiments, the client device may include (but are not limited to): personal computers, set top boxes, media players, and video game consoles, with communicatively coupled monitors, televisions, projection screens, or other devices capable of displaying graphical output.

At step 401, user input is received in a client device. User input may be received in a user input device, including (but not limited to): a controller, mouse, or keyboard; or through physical input devices such as buttons, analog control pads, or triggers, for example. The user input may be responsive to graphical output rendered by a server in a remotely located cloud data center and transmitted over a network connection, for example. In an embodiment, reception of the user input in the client device may be tracked, e.g., as a signal to initiate (or resume) monitoring of the network latency. At step 403, the user input is transmitted to a connected game server. Transmission may be accomplished over a network connection and according to one or more data transmission protocols. According to some embodiments, when the user input is received in the game server, a sequence of images may be rendered that is responsive to the input received. The sequence of images may be then encoded as a video and streamed over the network connection, where it is received by the client device at step 405. The encoded data is subsequently decoded at step 407, and finally displayed in the display device at step 409. Once the received data is decoded and displayed, the length of time since the user input was received may be measured and communicated to the game server as the determined latency. The game server may determine, based on the communicated latency, what portion of the latency is attributable to the network connection, and may adjust various internal production or communication rates accordingly, as previously described herein.

Example Computing Device

Figure 5:
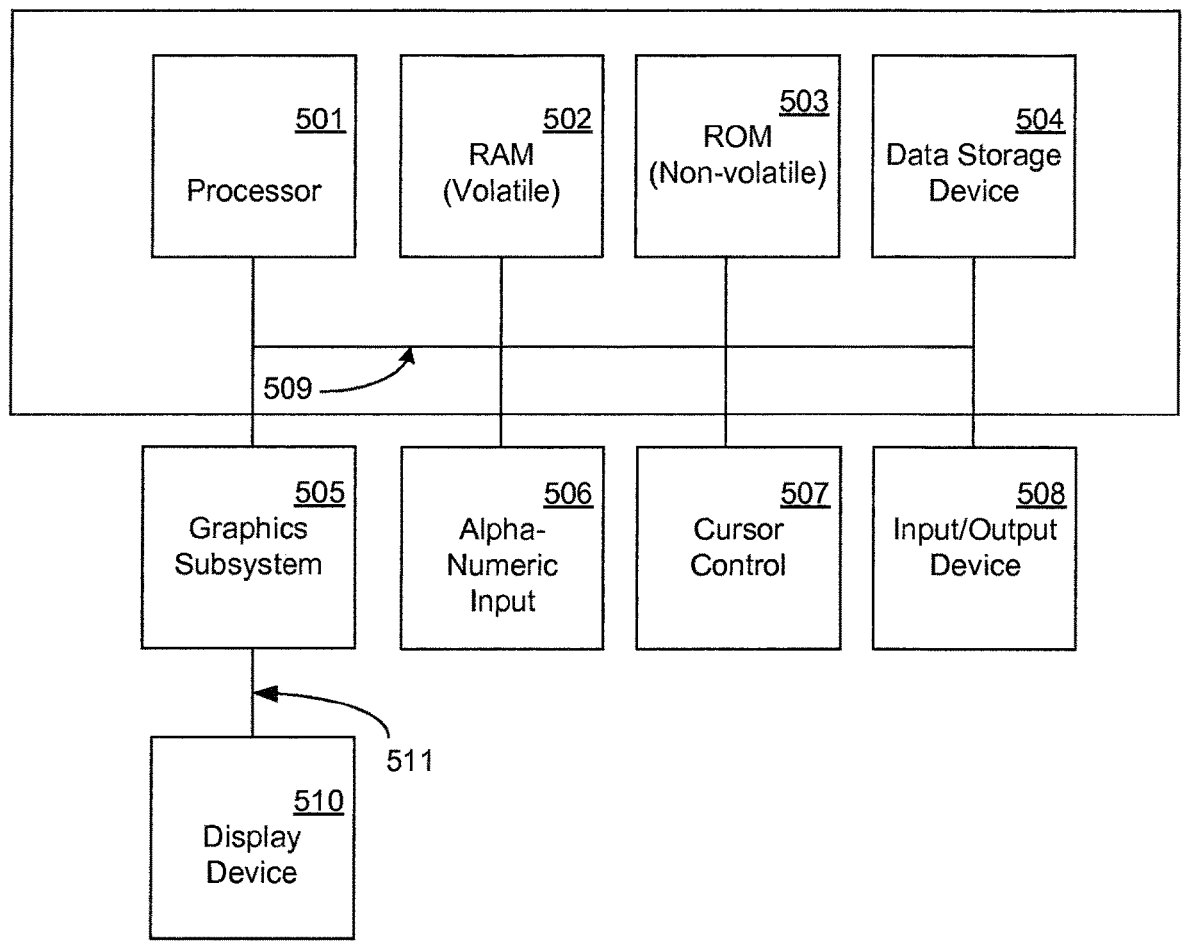
FIG. 5 is a block diagram of an exemplary computing system in accordance with various embodiments of the claimed subject matter.

As presented in FIG. 5, a system upon which embodiments of the present invention may be implemented includes a general purpose computing system environment, such as computing system 500. In an embodiment, a game server, such as the server 103 and 201 described above with respect to FIGS. 1 and 2 may be implemented as computing system 500. In alternate embodiments, a client device, such as client device 109 or 209 likewise described above with respect to FIGS. 1 and 2 may be implemented instead of, or in addition to the game server as computing system 500. In its most basic configuration, computing system 500 typically includes at least one processing unit 501 and memory, and an address/data bus 509 (or other interface) for communicating information. Depending on the exact configuration and type of computing system environment, memory may be volatile (such as RAM 502), nonvolatile (such as ROM 503, flash memory, etc.) or some combination of the two.

Computer system 500 may also comprise an optional graphics subsystem 505 for presenting information to the computer user, e.g., by displaying information on an attached display device 510, connected by a video cable 511. According to embodiments of the present claimed invention, the display device may be physically mounted on the computing system 500 and coupled to the graphics subsystem 505. Alternatively, the graphics subsystem 505 may be coupled directly to the display device 510 through the video cable 511, or indirectly via wireless means. Computing system 500 implemented as a game server may process and render graphical images in graphics subsystem 505 according to programmed instructions stored in memory (502, 503) and processed in processing unit 501. The graphical output produced by a game server may be received in a client device implemented as a second computer system 500, decoded in the processing unit 501 of the second computer system 500 and displayed to the user in the display device 510.

Additionally, computing system 500 may also have additional features/functionality. For example, computing system 500 may also include additional storage (removable and/or non-removable) including, but not limited to, magnetic or optical disks or tape. Such additional storage is illustrated in FIG. 5 by data storage device 507. Computer storage media includes volatile and nonvolatile, removable and non-removable media implemented in any method or technology for storage of information such as computer readable instructions, data structures, program modules or other data. RAM 502, ROM 503, and data storage device 504 are all examples of computer storage media.

Computer system 500 also comprises an optional alphanumeric input device 506, an optional cursor control or directing device 507, and one or more signal communication interfaces (input/output devices, e.g., a network interface card) 509. Optional alphanumeric input device 506 can communicate information and command selections to central processor 501. Optional cursor control or directing device 507 is coupled to bus 509 for communicating user input information and command selections to central processor 501. Signal communication interface (input/output device) 509, also coupled to bus 509, can be a serial port. Communication interface 509 may also include wireless communication mechanisms. Using communication interface 509, computer system 500 can be communicatively coupled to other computer systems over a communication network such as, for example, the Internet or an intranet (e.g., a local area network), or can receive data (e.g., a digital television signal).

As described herein, embodiments of the claimed subject matter have been provided which allow the delivery of a consistent quality of service, latency-wise, for cloud gaming services by monitoring and moderating rendered frame rates using dynamic frame rate adjustment to optimize for network latency savings (or surplus). According to various embodiments the encoding/streaming frame rate to the client can also be managed along with, or as an alternative to, managing the rendered frame rates. The claimed embodiments not only maintain a constant Quality of Service (QoS) for the user, but may also be employed to leverage well-performing networks to reduce operational costs. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   establishing a first network connection with a first remote computing device and a second network connection with a second remote computing device;
   determining a first network latency corresponding to the first network connection and a second network latency corresponding the second network connection;
   based at least in part on the first network latency and the second network latency, adjusting a first frame rate for rendering first image frames for the first remote computing device and a second frame rate for rendering second image frames for the second remote computing device,
   wherein the second frame rate is less than the first frame rate based at least in part on the second network latency being less than the first network latency.

2. The method of claim 1, wherein the method is executed by a computing device remotely located with respect to the first computing device and the second computing device.

3. The method of claim 1, wherein the first network connection and the second network connection are established during a streaming session of an instance of a game within a game application, further wherein the first computing device executes a first instance of the game application and the second computing device executes a second instance of the game application during the streaming session.

4. The method of claim 1, wherein the rendering the first image frames and the rendering the second image frames is based at least in part on data representative of at least one input to at least one of the first computing device or the second computing device.

5. The method of claim 1, further comprising transmitting first data representative of the first image frames to the first computing device and second data representative of the second image frames to the second computing device.

6. The method of claim 5, wherein the first data represents the first image frames after encoding and the second data represents the second image frames after encoding.

7. The method of claim 1, further comprising:
determining an updated network latency corresponding to the first network connection; and
based at least in part on the updated network latency, adjusting the first frame rate to an updated frame rate.

8. The method of claim 7, wherein the updated frame rate is less than the first frame rate when the updated network latency is less than the first network latency and the updated frame rate is greater than the first frame rate when the updated network latency is greater than the first network latency.

9. The method of claim 1, wherein at least one of the rendering the first image frames or the rendering the second image frames is executed using one or more graphics processing units (GPUs).

10. A method comprising:
establishing, using one or more host devices, network connections between the one or more host devices and a plurality of user devices remotely located with respect to the one or more host devices;
determining network latencies corresponding the network connections;
based at least in part on the network latencies, adjusting, using the one or more host devices, rendering frame rates corresponding to the plurality of user devices such that at least a first rendering frame rate corresponding to a first user device of the plurality of user devices is different from a second rendering frame rate corresponding to a second user device of the plurality of user devices,
wherein:
the first rendering frame rate is greater than the second rendering frame rate when a first network latency corresponding to a first network connection of the first user device is greater than the a second network latency corresponding to a second network connection of the second user device; and
the first rendering frame rate is less than the second rendering frame rate when the first network latency is less than the second network latency.

11. The method of claim 10, wherein the network latencies are determined based at least in part on data representative of the network latencies being received by the one or more host devices from respective user devices of the plurality of user devices.

12. The method of claim 10, wherein the network latencies are determined by the one or more host devices.

13. The method of claim 10, wherein the first network latency and the second network latency are compared to one or more network latency thresholds to determine the first rendering frame rate and the second rendering frame rate.

14. The method of claim 10, wherein the one or more host devices include one or more physical or virtual servers, and the plurality of user devices include at least one of a desktop computer, a laptop computer, a tablet computer, a mobile phone, or a game console.

15. The method of claim 10, wherein the determining the network latencies includes at least one of:
determining amount of time between inputs to the plurality of user devices being reflected in rendered image frames; or
determining an amount of time between the inputs to the plurality of user devices being visually reflected in displayed image frames at the plurality of user devices.

16. A system comprising:
a first computing device including one or more processing devices and one or more memory devices communicatively coupled to the one or more processing devices storing programmed instructions thereon, which when executed by the one or more processing devices causes the instantiation of:
a latency determiner to determine a first network latency corresponding to a first network connection between the first computing device and a second computing device and to determine a second network latency corresponding a second network connection between the first computing device and a third computing device;
a frame rate adjuster to, based at least in part on the first network latency and the second network latency, adjust a first frame rate for rendering first image frames for the second computing device and a second frame rate for rendering second image frames for the third computing device, wherein the first frame rate and the second frame rate are adjusted such that the second frame rate is less than the first frame rate when the second network latency is less than the first network latency and the second frame rate is greater than the first frame rate when the second network latency is greater than the first network latency;
a renderer to render the first image frames for the second computing device at the first frame rate and the second image frames for the third computing device at the second frame rate; and
a transmitter to transmit first data representative of the first image frames to the second computing device and second data representative of the second image frames to the third computing device.

17. The system of claim 16, further comprising:
a receiver to receive input data corresponding to one or more inputs to at least one of the first computing device or the second computing device,
wherein the latency determiner determines at least one of the first network latency or the second network latency based at least in part on an amount of time between the one or more inputs being provided and the one or more inputs being visually reflected in at least one of the first image frames, the second image frames, or displayed image frames at the first computing device or the second computing device.

18. The system of claim 16, wherein the first network latency and the second network latency are compared to one or more network latency thresholds to determine the first rendering frame rate and the second rendering frame rate.

19. The system of claim 16, further comprising an encoder to encode the first image frames to generate the first data and to encode the second image frames to generate the second data.

20. The system of claim 1, wherein the first network connection and the second network connection are established during a streaming session of an instance of a game within a game application, further wherein the second computing device executes a first instance of the game application and the third computing device executes a second instance of the game application during the streaming session.

* * * * *